United States Patent
Kikugawa

(10) Patent No.: US 7,969,838 B2
(45) Date of Patent: *Jun. 28, 2011

(54) OPTICAL DISK APPARATUS

(75) Inventor: Atsushi Kikugawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 807 days.

This patent is subject to a terminal disclaimer.

(21) Appl. No.: 11/834,744

(22) Filed: Aug. 7, 2007

(65) Prior Publication Data

US 2008/0219132 A1 Sep. 11, 2008

(30) Foreign Application Priority Data

Mar. 6, 2007 (JP) ................................. 2007-055011

(51) Int. Cl.
*G11B 7/00* (2006.01)

(52) U.S. Cl. ............. 369/47.28; 369/47.17; 369/124.12; 369/107

(58) Field of Classification Search ............... 369/47.28, 369/47.29, 106, 107, 47.17, 124.1, 124.12
See application file for complete search history.

(56) References Cited

U.S. PATENT DOCUMENTS

| | | | |
|---|---|---|---|
| 5,761,172 A | 6/1998 | Minemura et al. | |
| 5,774,444 A | 6/1998 | Shimano et al. | |
| 5,835,469 A | 11/1998 | Maeda et al. | |
| 5,886,969 A | 3/1999 | Maeda et al. | |
| 6,603,722 B1 * | 8/2003 | Taguchi et al. | 369/59.21 |
| 2002/0085468 A1 | 7/2002 | Kobayashi | |
| 2007/0053262 A1 | 3/2007 | Kikugawa et al. | |

FOREIGN PATENT DOCUMENTS

| | | |
|---|---|---|
| JP | 4-159623 | 6/1992 |
| JP | 08-077640 | 3/1996 |
| JP | 08-221758 | 8/1996 |
| JP | 2002-183970 | 6/2002 |
| JP | 2002-230814 | 8/2002 |
| JP | 2003-6874 | 1/2003 |

OTHER PUBLICATIONS

Tsuchiya Yoichi (JP Publication No. 05-342-762)-Abstract & Detailed Description.*
Lathi, Envelope detector; Modern Digital and Analog Communication Systems, HBJ; 1985; pp. 222-223; vol. 1.
Motoi Kimura, et al.; Signal Processing Techniques for Blu-Ray Disc Optical Heads; Institute of Electronics Information and communication Engineers (IEICE); IEICE Technical Report CPM2003-100 (Sep. 2003); pp. 1-14 or pp. 29-34.
Office Action issued in Japanese Patent Application No. 2007-055011 on Jun. 22, 2010.

* cited by examiner

*Primary Examiner* — Wayne R Young
*Assistant Examiner* — Dionne H Pendleton
(74) *Attorney, Agent, or Firm* — Antonelli, Terry, Stout & Kraus, LLP.

(57) ABSTRACT

An optical disk apparatus is provided which can: prevent an SNR deterioration attributable to an increase in read speed; overcome difficulty in separating a read signal and HF signal components; reduce laser noise; and maintain high reliability even during a high-speed read operation. An optical disk is irradiated with laser light pulsed by a high-frequency signal generated by a HF oscillator. The output of an optical detector which receives laser light reflected from the optical disk is converted into an electric pulse read signal using a current amplifier. The pulse read signal is converted into a temporally continuous read signal using a combination of an AD converter and a DA converter.

1 Claim, 11 Drawing Sheets

OPTICAL DISK APPARATUS

CLAIM OF PRIORITY

The present application claims priority from Japanese application JP 2007-055011 filed on Mar. 6, 2007, the content of which is hereby incorporated by reference into this application.

FIELD OF THE INVENTION

The present invention relates to an optical disk apparatus and more particularly to a circuit for reading information from an optical disk.

BACKGROUND OF THE INVENTION

Many of the optical disk apparatuses, including DVD drives, currently in use employ a high-frequency modulation method to reduce noise generated by a laser diode used as a laser light source. This is commonly known among those in the art. In terms of the high-frequency modulation method, therefore, only aspects associated with the present specification will be described in the following only to a required extent without further elaboration.

The background of the invention will be described below with reference to the inventions disclosed in JP-A No. H8 (1996)-77640, JP-A No. H8 (1996)-221758 and JP-A No. 2002-230814, or the reference—Lathi, B. P., Modern Digital and Analog Communication Systems, Volume 1, HBJ, 1985, p. 223.

In the high-frequency modulation method, the laser diode used is pulsed. Namely, the laser light intensity waveform obtained from the laser diode represents alternating emission-on and emission-off states as shown in FIG. 2. The duty that is the ratio of laser pulse duration to laser pulse interval (associated with laser pulse frequency) is a parameter which is adjusted to minimize laser noise. When a laser light intensity waveform is as shown in FIG. 2, a corresponding read signal waveform becomes as shown in FIG. 3 provided that no bandwidth limitation is effected either by a read photodiode or by a current to voltage converter amplifier. A signal composed of such a train of read pulses will hereinafter be referred to as a pulse read signal.

In FIG. 3, the dashed line represents a read signal waveform obtained when a laser diode is made to emit continuously with an output equivalent to a laser pulse peak obtained by high-frequency modulation. Namely, the upper envelope of the pulse read signal represents a read signal waveform obtained from continuous light. It is, therefore, possible to obtain a desired read signal waveform by making the pulse read signal go through a low-pass filter with a cutoff frequency adequately lower than the superimposed HF frequency (high frequency). In optical disk apparatuses currently in use, this is realized through bandwidth limitation by a system composed of a photodetector and a current to voltage converter amplifier and an analog equalizer. As for the HF frequency to be superimposed, in the case of a Blu-ray Disc (hereinafter referred to as the "BD") system, for example, it is typically about 400 MHz. The HF frequency to be superimposed is determined solely by the type of laser to be used and the optical path length of the read optical system, so that it does not differ much between apparatuses. The upper limit of the read signal frequency band based on a basic read speed (1×) is 16.5 MHz with the shortest recording mark or space being 2T (T=channel clock period).

FIG. 4A shows an example of a read signal spectrum obtained when a 25 GB disc is read at 6× speed in a BD system. FIG. 4B shows an example of a spectrum of HF laser pulses. The spectrum is an emission-line spectrum with the HF laser pulses making up a periodic signal. The HF frequency is set at 396 MHz to be equal to the channel clock frequency, i.e. six times the upper limit of the read signal spectrum. In this example, the laser pulse duty is 25%. The emission-line spectrum intensity ratio between spectral orders changes depending on the duty. FIG. 4C shows a pulse read signal spectrum. The waveform of the pulse read signal represents the product of the read signal waveform represented by the dashed line in FIG. 3 and the periodic HF pulse train, so that the pulse read signal spectrum is a convolution of the read signal spectrum and the pulse light spectrum. The pulse read signal spectrum is characterized in that the intensity of a higher-order read signal is comparable to that of the baseband read signal spectrum and that it has an emission line-like spectrum. Therefore, extracting a read signal, i.e. a baseband read signal spectrum, using bandwidth limitations by a system composed of a photodetector and a current to voltage converter amplifier and an analog equalizer requires the upper limit frequency of the read signal and the HF frequency to be adequately separated from each other.

Laser diodes used as laser light sources in optical disk apparatuses used to pose problems of not being adequately stable and generating large laser noise. The high-frequency modulation method is used to address such problems. It can reduce laser noise by pulsing the laser under appropriate conditions.

Even though, in the high-frequency modulation method, laser noise can be reduced to some extent, a resultant read signal obtained still contains a non-negligible amount of laser noise components. Attempts have been made, as disclosed in detail in JP-A No. 2002-183970 or in the reference—Kobayashi, M, et al., "Blu-ray Disc KOUGAKUKEI NI OKERU SHINGOU SHORI GIJYUTSU" (Technique for Signal Processing in Blu-ray Disc Optical System), Technical Report of IEICE CPM2003-100 (September 2003), item 29-34. In the method used in such attempts, a laser noise waveform is monitored using a power monitor system having an adequately wide bandwidth, and the laser noise waveform monitored is subtracted from the read signal.

FIG. 5 schematically shows the configuration of a laser noise elimination circuit for the above method. In the power monitor system shown in FIG. 5, a portion of a laser output beam is extracted at a beam splitter 42 from the main path, and the extracted beam is converged on a photodiode 9' using a conversion lens 8' and the intensity of the converged beam is measured. Conventionally, a power monitor was, in many cases, used to measure an average laser power, so that its bandwidth was normally narrower than the read signal bandwidth. In the present known example, the photodiode 9' and the current amplifier 13' connected to the photodiode 9' have adequately wide bandwidths making it possible to monitor not only the laser power but also a laser noise waveform.

In a read signal, laser noise is not simply superimposed on the read signal. The laser noise amplitude in the read signal differs between marks and spaces. This is because the laser noise, in reality, represents light source intensity modulation. In the present known example, the measured laser noise is not simply subtracted from the read signal, but, as known from FIG. 5, analog operation is performed to eliminate the influence of the laser noise. First, the read signal and the power monitor output having passed a low-pass filter 15 are multiplied using an analog multiplier 40. Next, the power monitor output having passed a high-pass filter 41 and the read signal are multiplied at the analog multiplier 40'. The product obtained is subtracted from the product of the first multiplication at a subtractor 30. Through this process, the influences of the amplitude difference between the read signal and the power monitor output as well as that of the recording marks are eliminated, that is, the laser noise is eliminated from the read signal.

SUMMARY OF THE INVENTION

Improvement of the read speed that is a basic performance item of optical disk apparatuses is always demanded, and it can be said of BD systems, too. The maximum read speed specified in the current BD system standard (as of 2007) is double speed. Higher read speeds will certainly be demanded in the future.

In the case of BD systems, the read speed may increase up to 12-times speed based on the assumption that the maximum disc rotation speed achievable while securing adequate reliability is about 10,000 rpm to be equivalent to that of DVD drives.

The double speed specified by the current standard is based on the premise that a method in which, as described in the section "BACKGROUND OF THE INVENTION," a continuous read signal is obtained from a pulse read signal is used. As the read speed is increased in the future, however, a system using such a method will encounter at least the following two problems. First of the two problems is deterioration of the signal to noise ratio (SNR) on account of the read signal bandwidth expansion. The second problem is that, as the read signal bandwidth expands, the HF frequency and the read signal bandwidth come closer to each other making it difficult to separate the read signal in the baseband and the higher-order spectrum. The first problem arises when the read speed is increased regardless of the method used. The second problem is peculiar to systems using high-frequency modulation.

The second problem will be further described below. As described in the section "BACKGROUND OF THE INVENTION," the pulse read signal spectrum is characterized in that the intensity of higher-order read signal spectra are comparable to that of the baseband read signal spectrum and that it has an emission line-like spectrum. Therefore, as the upper limit frequency of the read signal and the HF frequency come closer to each other, it becomes difficult to separate them. It may be considered to separate them by raising the HF frequency. Sence the HF frequency being a parameter determined to be optimum for laser noise elimination, simply increasing the HF frequency makes it less optimum for laser noise elimination, so that it cannot be arbitrarily changed. As described in the section "BACKGROUND OF THE INVENTION," in the case of a BD system, the practical HF frequency is about 400 MHz. Raising the HF frequency cannot be said advisable from a viewpoint of power consumption, either.

The laser noise elimination technique described in the section "BACKGROUND OF THE INVENTION" also poses a problem as the read speed increases. That is, in the above known example, both the read signal and the power monitor output use circuits similar to conventional read signal circuits. Namely, the technique is based on the premise that a pulse read signal and a power monitor signal are converted into a continuous signal using low-pass filter characteristics of a photodiode and a current amplifier. Therefore, when the read signal bandwidth expands making it necessary to eliminate laser noise in a correspondingly expanded bandwidth, it is difficult to adequately attenuate the HF signal contained in the power monitor signal. This situation is similar to that of the read signal. If the HF signal component is not adequately attenuated, in the above known example, the read signal is distorted by the frequency modulation caused by residual HF components.

Summarizing what has been described above, the object of the present invention is to provide an optical disk apparatus which can: prevent an SNR deterioration attributable to an increase in read speed; overcome difficulty in separating a read signal and HF signal components; reduce laser noise; and maintain high reliability even during a high-speed read operation.

To achieve the above object, the optical disk apparatus according to the present invention includes: an unit which converts a pulse read signal into a continuous signal without impairing the signal amplitude; an unit which, in synchronization with a HF signal, captures and holds the peak value of each pulse included in the pulse read signal; an unit which converts the peak value thus captured and held into a digital value; an unit which reduces the emission-line spectrum out of the distortion components contained in the pulse read signal spectrum; an unit which, independently of the channel clock being used, generates a HF signal to be superimposed on a laser drive current; and an unit which eliminates laser noise.

The unit that converts a pulse read signal into a continuous signal may be, for example, a combination of an AD converter and a DA converter. Using a combination of an AD converter and a DA converter makes it possible to effectively reduce distortion components, the distortion components including emission lines which are attributable to the HF signal and which appear in the high-frequency spectrum of the pulse read signal. This makes distortion elimination by use of a low-pass filter easy.

The unit that eliminates laser noise includes an arithmetic circuit which calculates, based on the pulse signal in the power monitor system, the fluctuation caused by laser noise of the pulse read signal amplitude.

The present invention can greatly improve the read signal quality in an optical disk apparatus. The present invention also makes it easy to use high-frequency modulation to reduce laser noise while allowing a high-speed read operation.

DETAILED DESCRIPTION OF THE PREFERRED EMBODIMENTS

Embodiments of the present invention will be described below with reference to drawings.

First Embodiment

Figure 1:
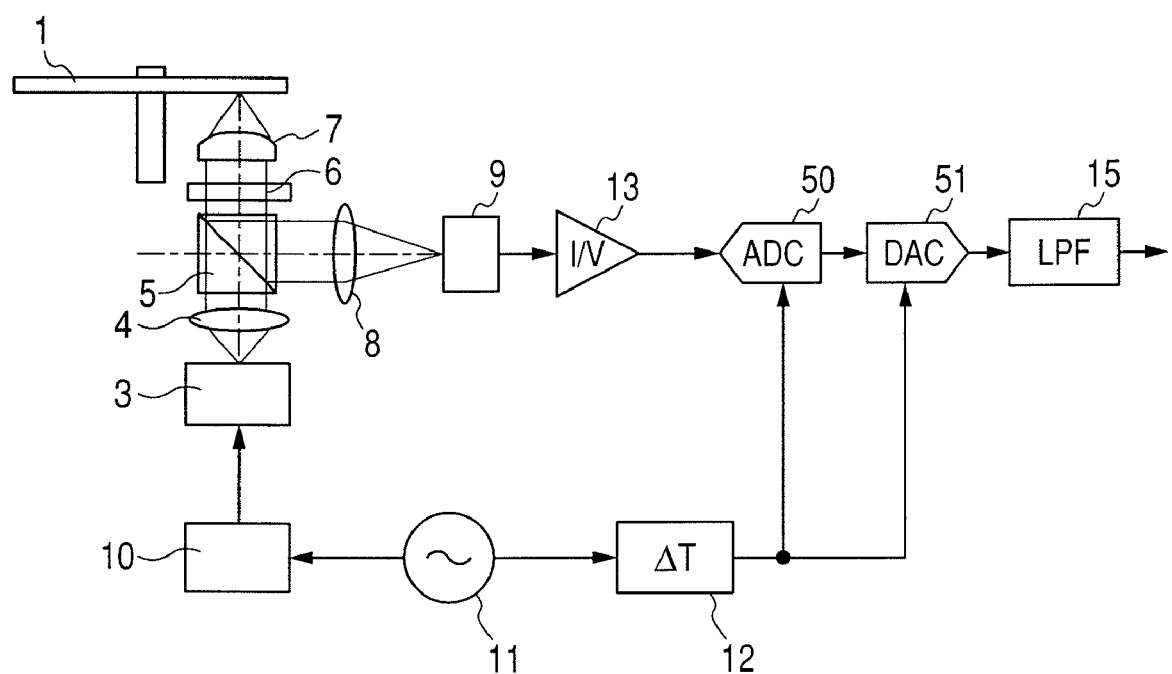
FIG. 1 is a schematic diagram showing an example of an optical disk apparatus according to the present invention.

FIG. 1 is a schematic diagram showing an example of an optical disk apparatus according to the present invention. The schematic diagram mainly illustrates the pickup section of the optical disk apparatus with portions of the optical disk apparatus which are not indispensable for the following description omitted. The present embodiment is characterized in that it uses an analog to digital (AD) converter 50 and a digital to analog (DA) converter 51 to convert a pulse read signal into a continuous waveform signal. The pulse read signal is composed of a train of temporally discrete pulses. The essence of the pulse read signal is in the time of occurrence and the peak value of each pulse. The continuous signal referred to in the present specification refers to a signal which differs from the pulse read signal in that it is not composed of essentially temporally discrete components (pulses) only. The continuous signal as referred to in this specification, therefore, has a broader sense than a continuous signal generally referred to. For example, a signal whose amplitude abruptly reduces to zero for a short period of time, thereby forming a discontinuous change in the signal, is also referred to as a continuous signal in this specification.

Figure 2:
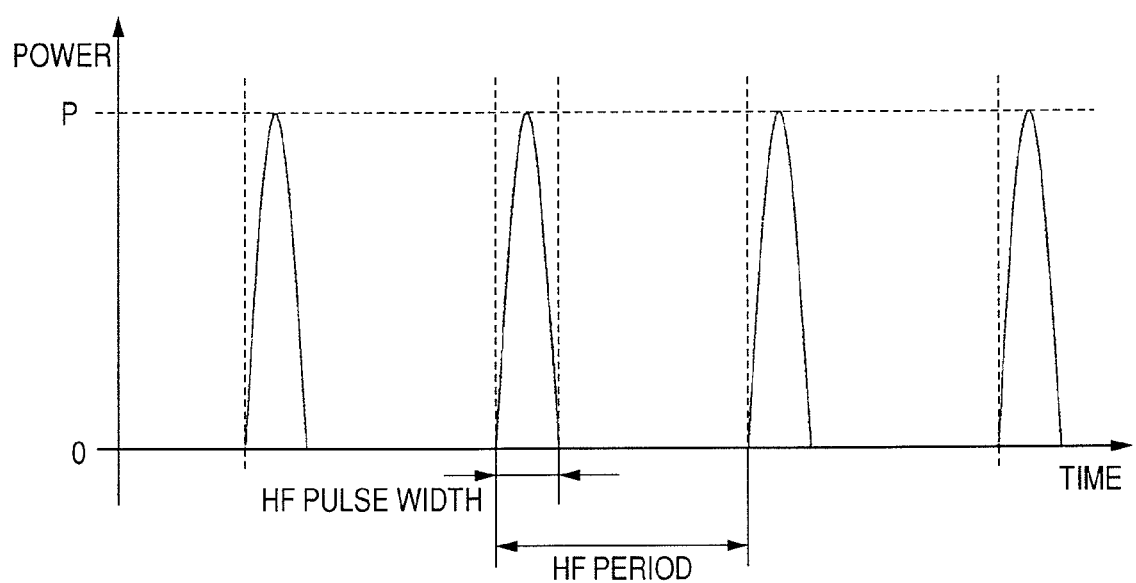
FIG. 2 is a diagram explaining high-frequency modulated laser emission.

A high-frequency (HF) signal to be superimposed on a laser drive current is generated at an HF oscillator 11 and inputted to a laser driver 10. The laser driver 10 generates a laser drive current required to obtain a desired average laser power, peak power, and duty, and inputs the laser drive current to a laser diode 3. The laser driver 10 also controls the laser drive current so as to keep the average laser power constant. The output power of the laser diode 3 changes with time as shown in FIG. 2.

The laser beam is collimated by a collimator lens 4. The collimated laser beam is then, after passing a polarizing beam splitter 5 and a quarter wavelength plate 6, focused on the recording layer of a disk 1 by an objective lens 7. The laser beam focused on the recording layer is reflected from the recording layer to be thereby turned into a reflected laser pulse train superimposed with intensity changes corresponding to recording marks and spaces. The laser beam intensity variation in time correspond to the pulse read signal shown in FIG. 3. The reflected laser pulse train follows the beam path back to the polarizing beam splitter 5 where it is reflected to a converging lens 8, and is converged on a photodiode 9 which converts the converged laser pulse train into an electric current. The electric current generated is, after being converted into a voltage signal by a current amplifier 13, converted into a digital signal by an AD converter 50. The digital signal is then converted into an analog signal again by a DA converter 51.

Figure 3:
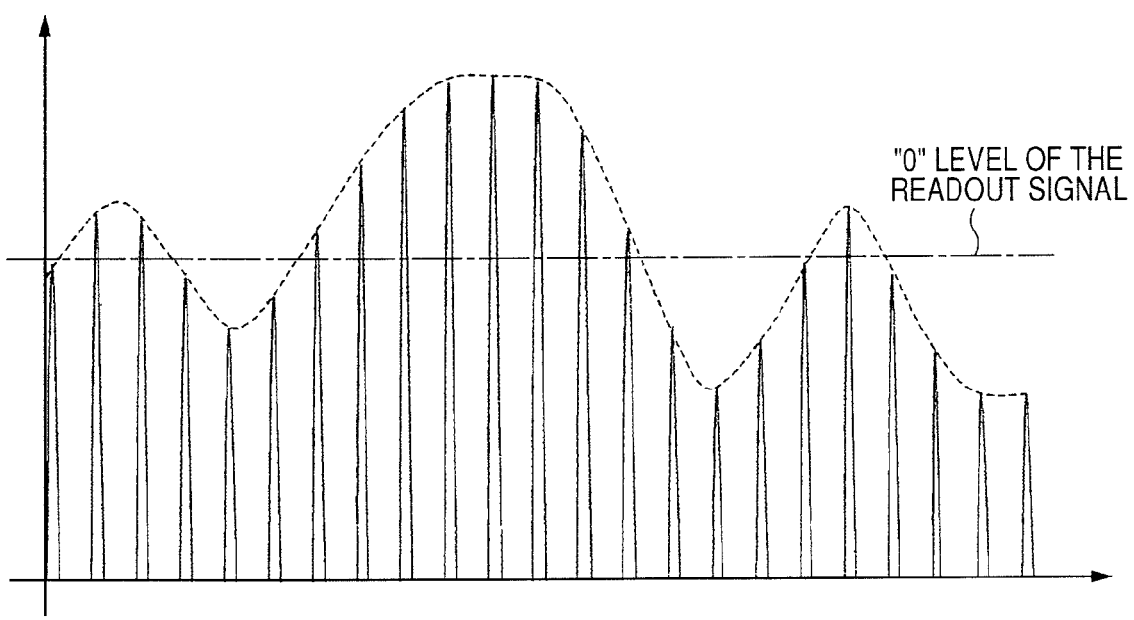
FIG. 3 is a diagram explaining pulse read signal definition.

The analog to digital signal conversion requires to be carried out in synchronization with the pulse train in such a manner that the peak value of each pulse is captured for the conversion. For this, the output of the HF oscillator 11 is adjusted using a variable delay line 12 so that its phase meets the requirement, and the HF oscillator output thus adjusted is used as a driving clock for the AD converter and the DA converter. As described in the section "BACKGROUND OF THE INVENTION," FIG. 3 is based on a condition that no bandwidth limitation is effected either by the read photodiode or by the current to voltage converter amplifier. In cases where any bandwidth limitation is effected by them, individual laser pulses are extended and their peak values decrease depending on the extent of the bandwidth limitation. Still, a read signal approximately identical with the one shown in FIG. 3 can be obtained as long as a certain minimum bandwidth is secured. Since the output of the DA converter has a step-like waveform, a low-pass filter 15 is used to eliminate unwanted harmonic components from the output and thereby obtain a smooth read signal.

The above signal conversions will be described in more detail. For simplification, the AD converter and the DA converter are assumed to operate in an ideal manner.

Figure 6:
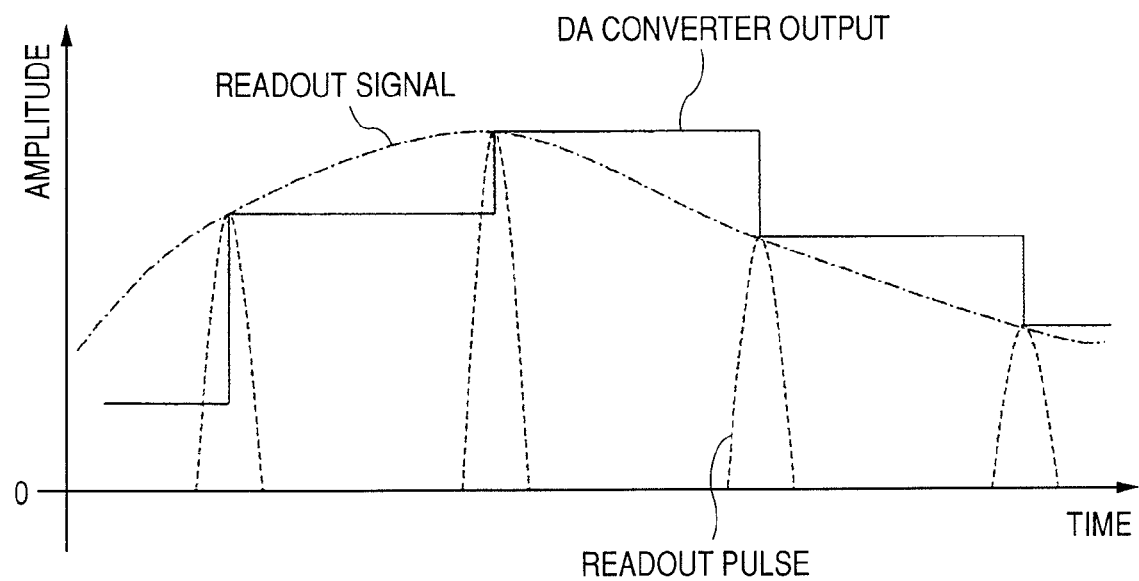
FIG. 6 shows relationships between pulse read signal, read signal, and DA converter output.

FIG. 6 shows a relationship between a pulse read signal and the output of the DA converter shown in FIG. 1. In FIG. 6, the dashed lines represent a pulse read signal, the dotted and dashed line represents a read signal, and the solid line represents the DA converter output. The DA converter output makes up a step-like signal with individual steps representing the peaks of individual pulses represented by the pulse read signal. In FIG. 6, for the convenience of explanation, the DA converter output is represented as being phase-synchronized with the pulse read signal. In reality, however, the process of outputting the result of the analog to digital conversion after subjecting it to the subsequent digital to analog conversion takes one HF clock period, so that the step-like signal representing the DA converter output is one HF clock period behind the pulse read signal.

Figure 4A:
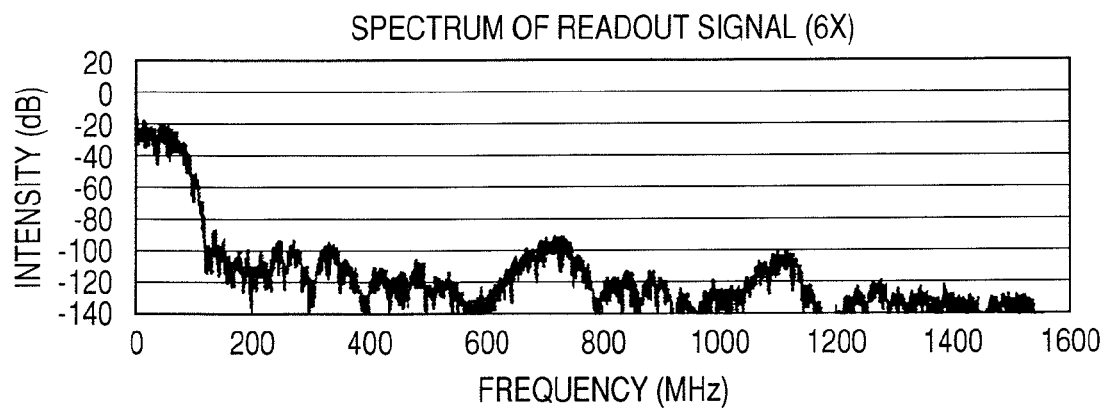
FIG. 4A shows a read signal spectrum.
Figure 4B:
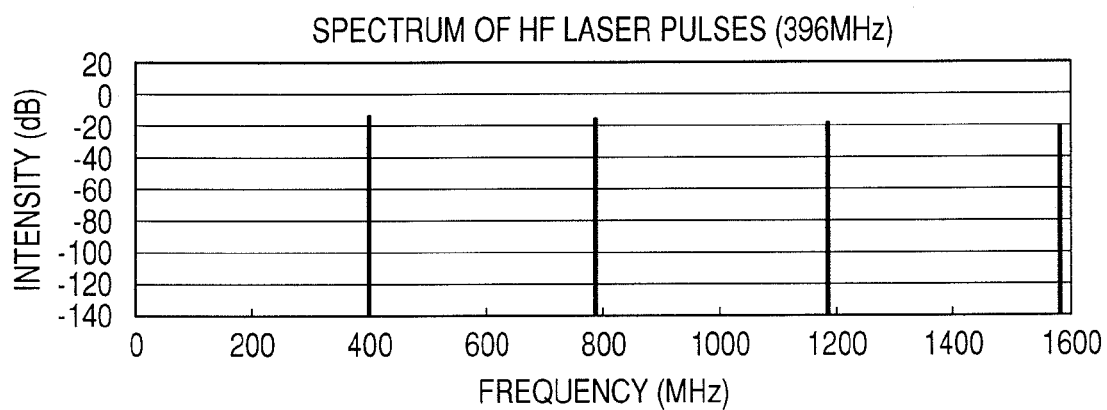
FIG. 4B shows a HF laser pulse spectrum.
Figure 4C:
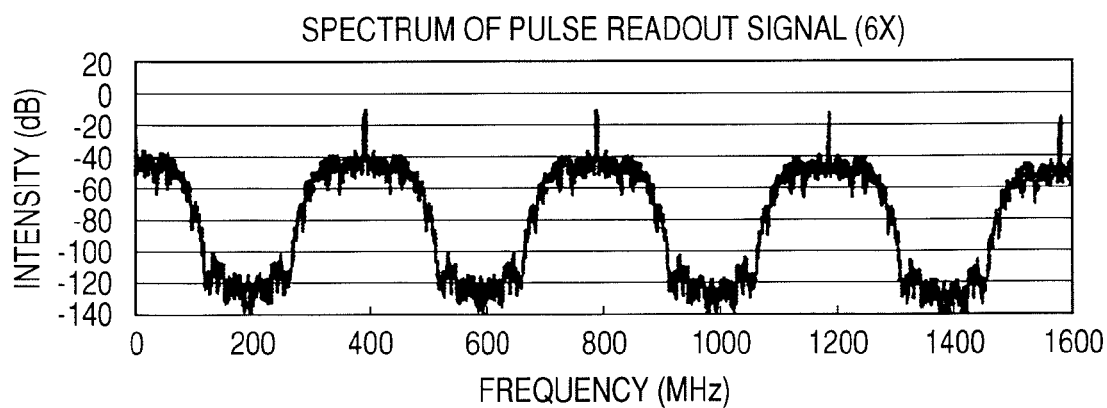
FIG. 4C shows a pulse read signal spectrum.
Figure 5:
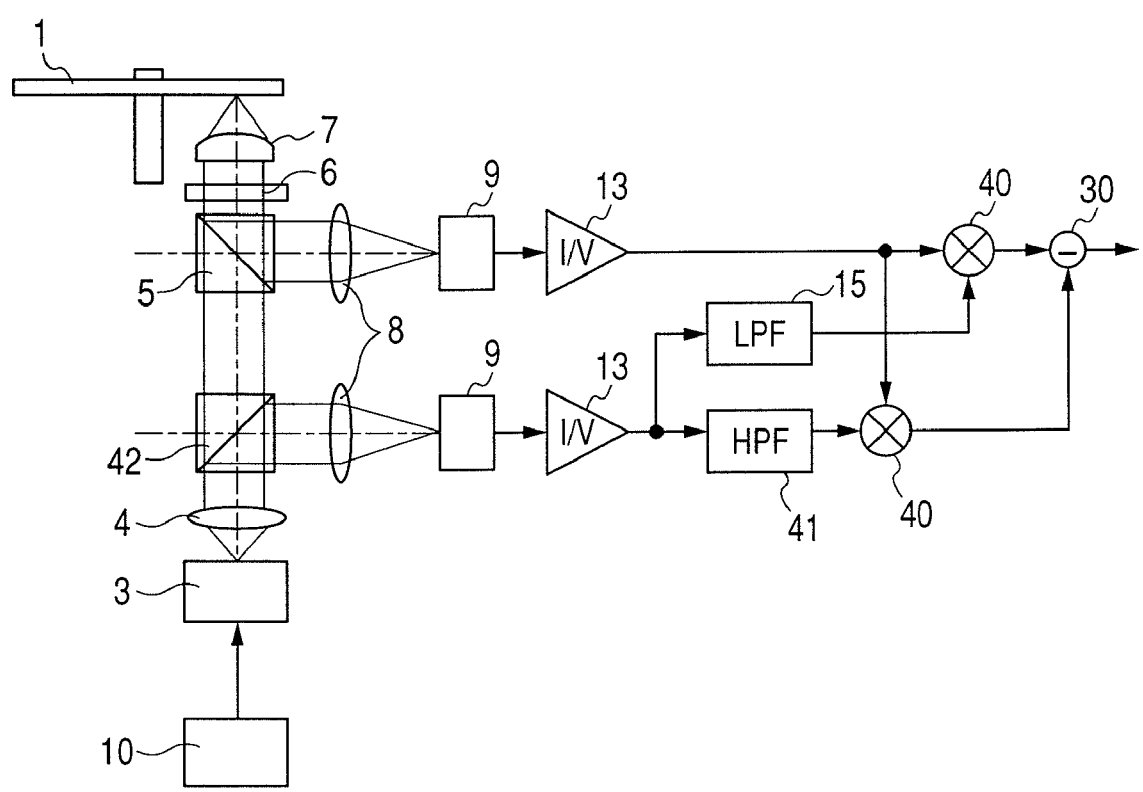
FIG. 5 shows a configuration of a laser noise elimination circuit using an analog multiplier.
Figure 7A:
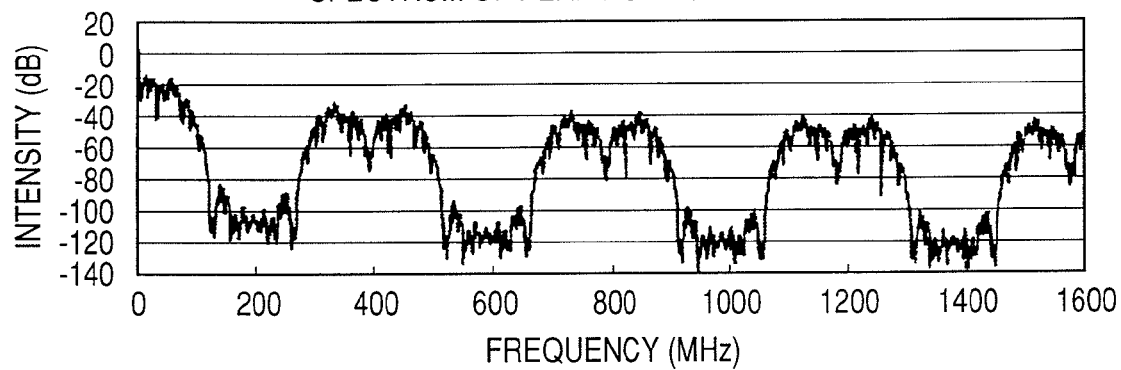
FIG. 7A shows a DA converter output spectrum.

FIG. 7A shows an example spectrum of a DA converter output corresponding to the spectrum of a pulse read signal shown in FIG. 4C. Compared with the pulse read signal spectrum shown in FIG. 4C, the DA converter output spectrum shown in FIG. 7A shows two significant features. One is that the harmonic spectrum (distortion components) is free of emission-line spectrum. This is decisively advantageous in removing influences of high frequency modulation using a low-pass filter. That is, in the pulse read signal, the emission-line spectrum at the HF frequency is about 30 dB more intensive than the read signal spectrum, so that a correspondingly enhanced reduction ratio is required of the low-pass filter. The other is that the harmonic spectrum (distortion components) excluding the emission-line spectrum attenuates faster than in the case of the pulse read signal. The second harmonic component that is an important factor to be considered is 20 dB lower than the fundamental wave, whereas, in the case of the pulse read signal, the second harmonic intensity is about the same as the fundamental spectrum.

Figure 7B:
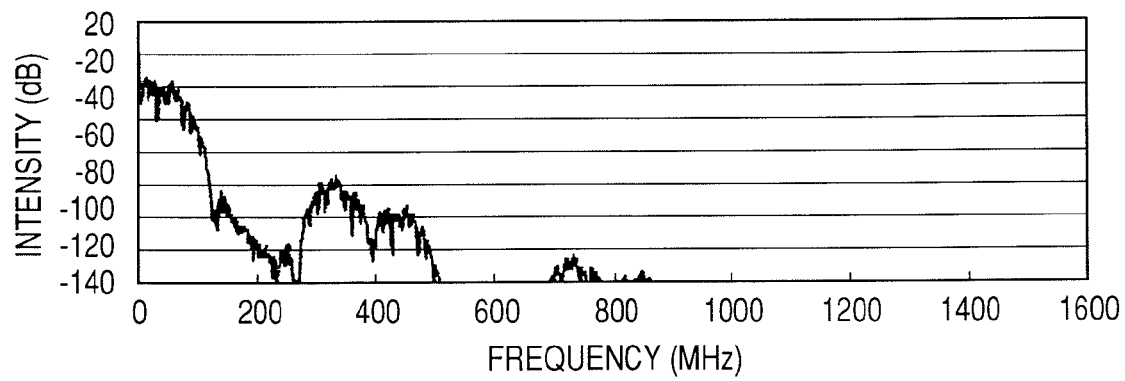
FIG. 7B shows a spectrum of the DA converter output having passed a low-pass filter.

Thanks to the above features, removing distortion components from the DA converter output using a low-pass filter is much easier than in the case of the pulse read signal. FIG. 7B shows a signal spectrum obtained by actually applying a 6th Bessel low-pass filter with a cutoff frequency of 150 MHz to the DA converter output spectrum shown in FIG. 7A. Even though the filter is of a relatively moderate characteristic, the spectrum shown in FIG. 7B shows almost no distortion components.

Referring to FIG. 1, the output of the low-pass filter 15 is equivalent to the pickup output in a conventional optical disk apparatus. Therefore, the read signal may subsequently be processed as done in a conventional optical disk apparatus.

Second Embodiment

Figure 8:
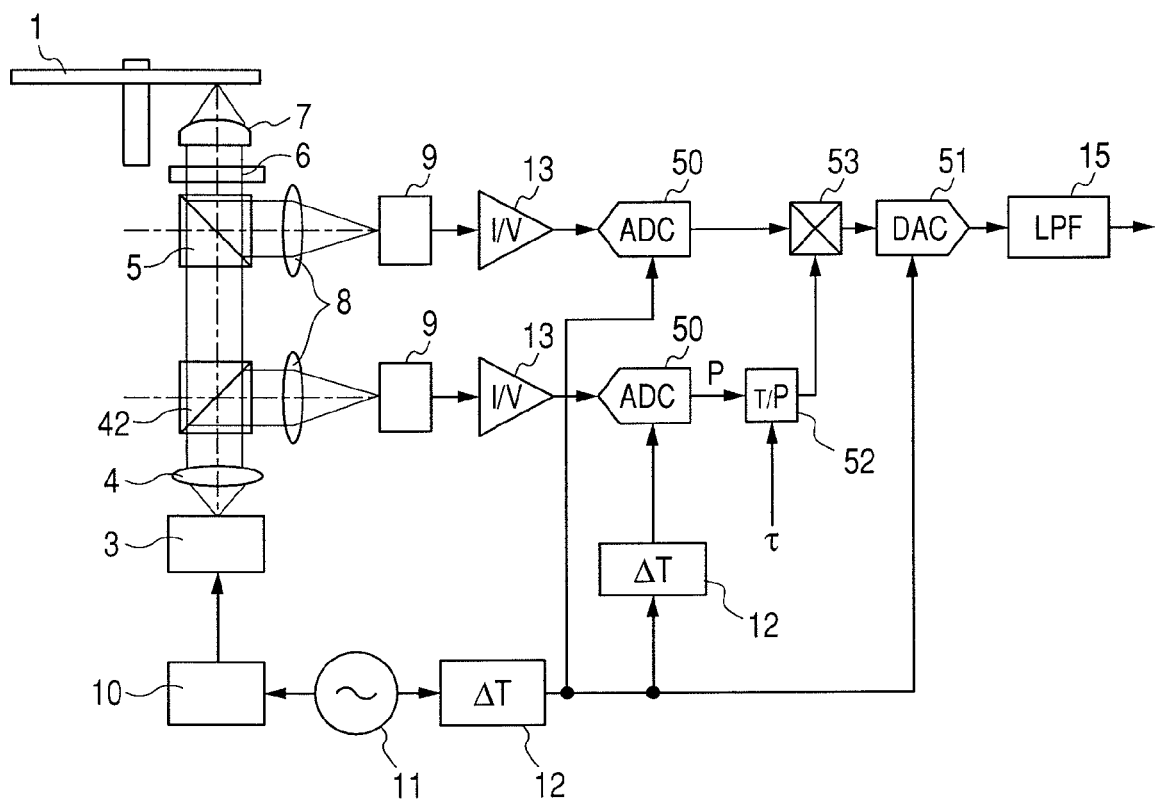
FIG. 8 shows a configuration of an optical disk apparatus using a laser noise elimination circuit which performs digital operation.

FIG. 8 is a schematic configuration diagram of an optical disk apparatus in which laser noise is reduced according to the present invention. The second embodiment is characterized in that: a laser power monitor having a wide bandwidth comparable to the one used in the first embodiment is used; the amplitude of power monitor output is measured using an AD converter; and the measurement result is used to eliminate laser noise.

A high-frequency (HF) signal to be superimposed is generated at an HF oscillator 11 and inputted to a laser driver 10. The laser driver generates a laser drive current required to obtain a desired average laser power, peak power, and duty, and inputs the laser drive current to a laser diode 3. The laser driver also controls the laser drive current so as to keep the average laser power constant. At this time, the laser diode is pulsed as shown in FIG. 2.

The laser beam is collimated by a collimator lens 4. Part of the collimated laser beam is, at a beam splitter 42, branched into a power monitor system. The operation of the power monitor system will be described later. The laser beam having passed the beam splitter 42 without being branched off is then, after passing a polarizing beam splitter 5 and a quarter wavelength plate 6, focused on the recording layer of a disk 1 by an objective lens 7. The laser beam focused on the recording layer is reflected from the recording layer to be thereby turned into a reflected laser pulse train superimposed with intensity changes corresponding to recording marks and spaces. The laser beam intensity variation in time to the pulse read signal shown in FIG. 3. The reflected laser pulse train follows the beam path back to the polarizing beam splitter 5 where it is reflected to a converging lens 8, and is converged on a photodiode 9 which converts the converged laser pulse train into an electric current. The electric current generated is, after being converted into a voltage signal by a current amplifier 13, converted into a digital signal by an AD converter 50. The analog to digital signal conversion requires to be carried out in synchronization with the pulse train in such a manner that the peak value of each pulse is captured for the conversion. For this, the output of the HF oscillator 11 is adjusted using a variable delay line 12 so that its phase meets the requirement, and the HF oscillator output thus adjusted is used as a driving clock for the AD converter. The operation up to here is the same as in the first embodiment.

Next, the operation of the power monitor system will be described. The laser beam branched toward the power monitor system is converged on a photodetector 9' and converted into a current signal. The current signal is then converted into a voltage signal by a current amplifier 13'. The photodetector 9' and the current amplifier 13' each have a bandwidth wide enough compared to the HF frequency, so that the laser pulses can be monitored as in the readout system. The laser pulses are converted into a digital signal by an AD converter 50'. At this time, the driving clock for the AD converter 50' is, as done in the readout system, phase-adjusted using a variable delay line 12' so that the HF oscillator output can be captured at pulse peaks. The readout system and the power monitor system are, however, arranged apart from each other and have different optical paths with different lengths, so that there is a phase difference between the pulse trains monitored in the readout system and in the power monitor system. To perform process subsequent to the analog to digital signal conversion, it is necessary to adjust the phase of those two pulse trains. In the present embodiment, the phase of the clock signal supplied to the AD converter 50' in the power monitor system is adjusted by using the variable delay line 12'.

The height of each pulse monitored in the power monitor system is proportional to the corresponding laser pulse intensity. Generally, the intensity of a laser beam is controlled such that the average laser pulse height is kept at the target value. In the present embodiment, the average output of the laser diode is also controlled by controlling the laser drive current such that the average laser pulse height is kept constant. Since the method is already known, it will not be further elaborated in this specification.

Figure 9:
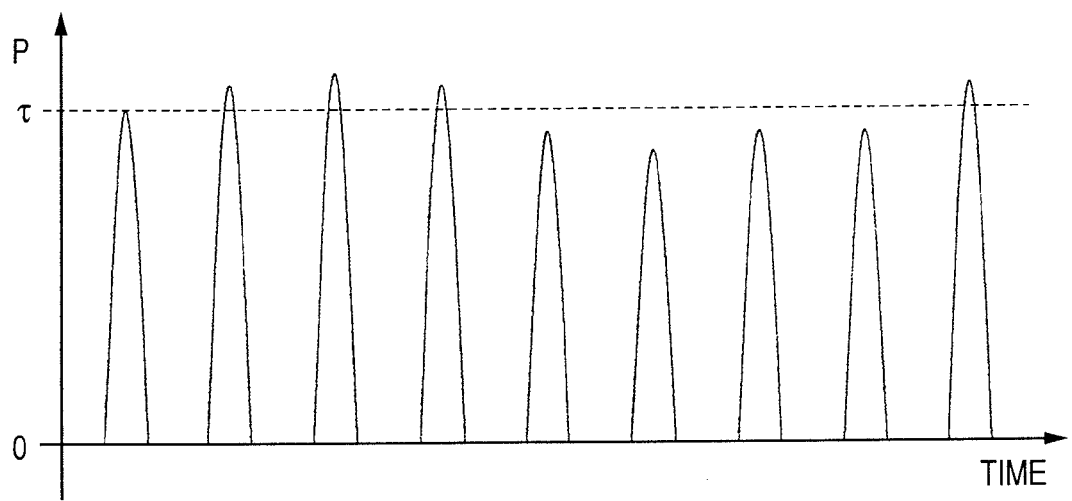
FIG. 9 shows diagrams for explaining relationships between laser noise and a read signal.
Figure 9:
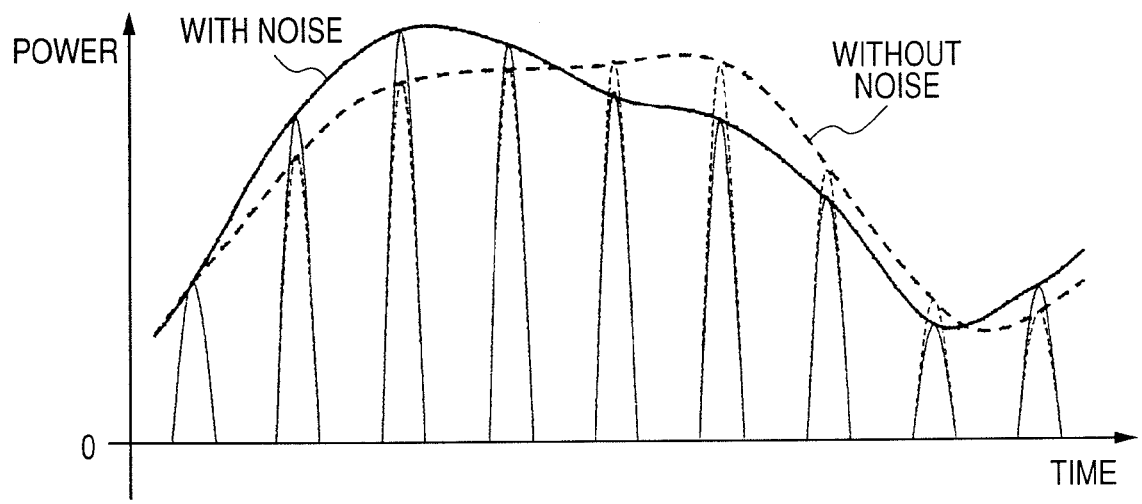
Figure 9:
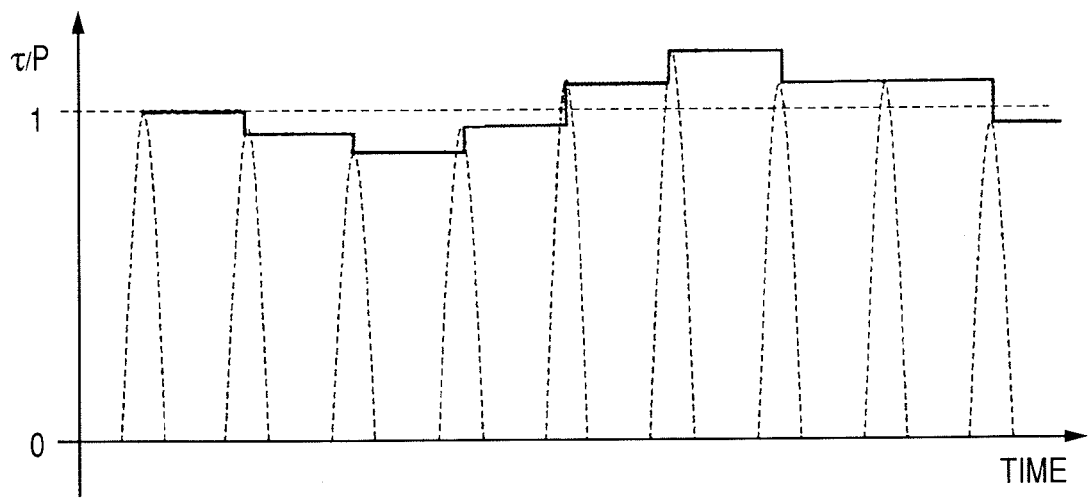

In FIG. 9, the top diagram schematically represents a pulse train monitored in the power monitor system. The laser diode is required to emit pulses with a target intensity represented, in this specification, by the symbol τ. In reality, as shown in FIG. 9, laser pulses are emitted with intensities differing from the target intensity. This leads to laser noise generation in a read operation carried out in an optical disk apparatus. Namely, when intensity of the emitted pulses differ from the target value, the intensities of pulses reflected from the recording layer of the disk are also varied proportionately, so that the resultant read signal is not identical with a read signal obtained in cases where laser pulses are emitted with a uniform intensity. The difference between the two read signals is equivalent to the laser noise generated in a read operation carried out in the optical disk apparatus. This is illustrated in the middle diagram of FIG. 9. In the middle diagram of FIG. 9, the pulse train represented by dashed lines and the dashed line smoothly connecting the peaks of pulses included in the pulse train represented by the dashed lines represent a pulse read signal and a read signal, respectively, obtained in cases where no laser noise is present. Similarly, the pulse train represented by solid lines and the solid line smoothly connecting the peaks of pulses included in the pulse train represented by the solid lines represent a pulse read signal and a read signal, respectively, obtained in cases where laser noise is present.

Using a divider 52 shown in FIG. 8, the target pulse intensity is divided by the output (digitized pulse intensity value represented by "P") of the AD converter 50' in the power monitor system. The resultant quotient represents the ratio of the real laser intensity to the target laser intensity (the bottom diagram in FIG. 9 represents the quotient of τ/P). The pulse read signal is multiplied by τ/P using a multiplier 53, thereby canceling the effect of deviation of the actual laser intensity from the target laser intensity on each pulse included in the pulse read signal. This method has been made practicable as digitizing the pulse-by-pulse laser intensity has made it possible to perform the division and multiplication as described above for each pulse without failure. The output of the multiplier 53 is inputted to the DA converter 51 for conversion into an analog signal. The DA converter 51 outputs a step-like read signal free of laser noise. The step-like read signal is made to go through a low-pass filter 15 to be smoothed by removing the unwanted harmonic components.

Figure 10:
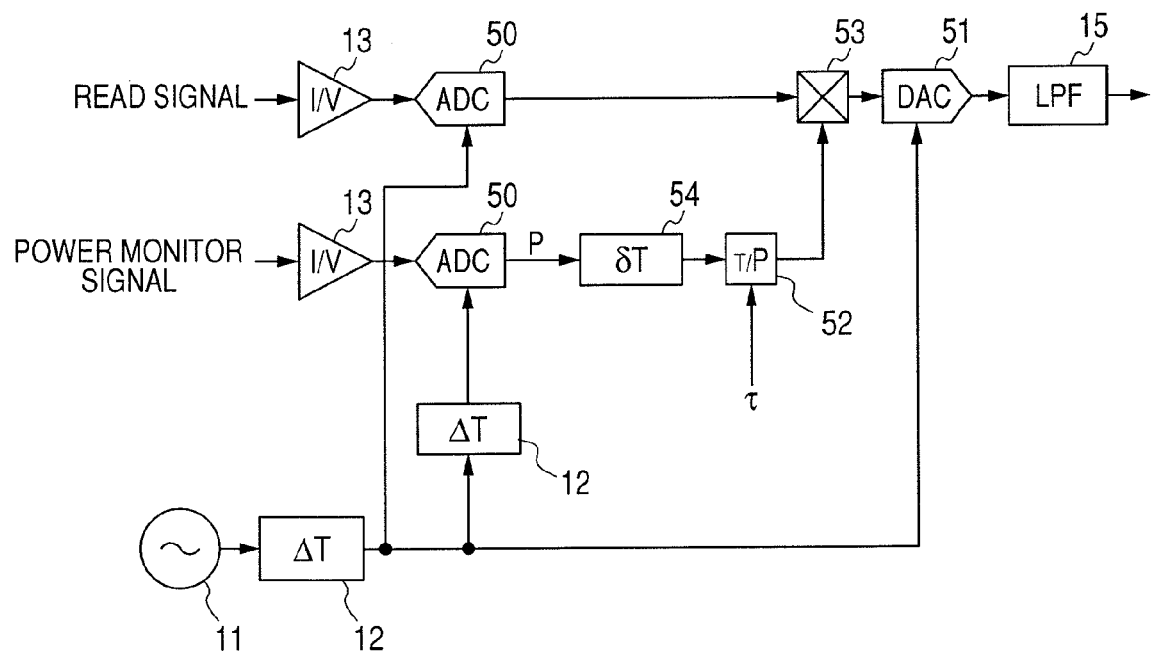
FIG. 10 shows a laser noise elimination circuit using a delay adjustor.

As described before, it is desired that the pulse signals generated out of the same original pulse signal by being divided at the beam splitter 42 to proceed to the readout system and the power monitor system are desired to reach the multiplier 53 at the same time. However, this condition is not satisfied in general because the readout system includes longer optical path than the power monitor system. When the difference in time required to reach the multiplier 53 between the read system and the power monitor system is small, the influence of the difference can be eliminated, for example, by adjusting the phase of the driving clock for the AD converter 50' in the power monitor system as described above. In cases where the difference in time required to reach the multiplier between the two systems is large and making it difficult to perform multiplication between the divided pulse signals generated from the same original laser pulse, a delay adjuster 54 may be used, as shown in FIG. 10, to delay the signal processed in the power monitor system as required. The delay adjuster may be disposed anywhere between the AD converter 50' and the multiplier 53. For example, it may be disposed downstream of the divider 52.

Referring to FIG. 8, the output of the low-pass filter 15 is equivalent to the pickup output in a conventional optical disk apparatus. Therefore, the read signal may subsequently be processed as done in a conventional optical disk apparatus.

Third Embodiment

When part of a laser beam is branched to the power monitor system, the ratio of the laser beam portion reaching the disk decreases. This does not pose any problem for a read-only apparatus. In the case of a recordable optical disk apparatus, however, it is necessary to secure certain amount of light usable for recording, so that the ratio of the laser beam portion that may be branched to the power monitor system is limited. At the same time, if the laser beam portion branched to the power monitor system is less than required, the SNR (signal to noise ratio) of the signal processed in the power monitor system decreases, for example, on account of amplifier noise and such. This lowers the laser noise elimination accuracy.

One method of avoiding this problem is to change the division ratio of the beam splitter depending on occasions: recording or reading. Such a method can be realized by using a liquid crystal device. Because liquid crystal devices are slow-response devices, however, using a liquid crystal device for the above purpose poses a problem concerning the time taken to switch the optical disk apparatus between recording and reading.

Generally, laser noise has more low-frequency components than high-frequency components. Therefore, it may be considered to apply an average of $\tau/P$ values collected at plural times so as to eliminate low-frequency components of laser noise, which exert a greater influence than high-frequency components, instead of one $\tau/P$ value collected at single time. Elimination of high-frequency components may be sacrificed, however, accuracy in removing low-frequency components can be maintained.

Figure 11:
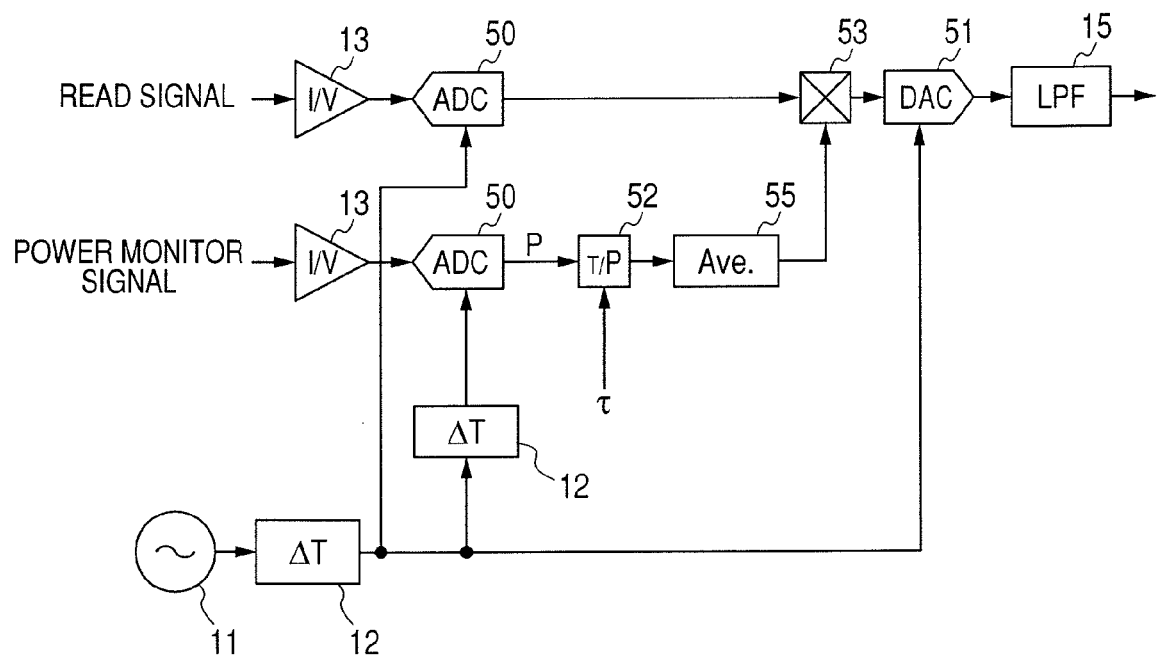
FIG. 11 shows a laser noise elimination circuit using a moving averager.

FIG. 11 shows a configuration of a laser noise elimination circuit which makes it possible, even in cases where the amount of laser beam that can be branched into a power monitor system is limited in a recordable optical disk apparatus, to prevent the pulse amplitude measurement accuracy from lowering and maintain a required laser noise elimination accuracy in the power monitor system. The circuit configuration is characterized in that it includes a laser noise elimination circuit equivalent to the laser noise elimination circuit shown in FIG. 8 with a moving averager 55 additionally disposed between the divider 52 and the multiplier 53. Namely, in the circuit shown in FIG. 11, an average of $\tau/P$ values collected at plural time is calculated and laser noise elimination operation is performed using the average value. It is also possible to calculate an average of $\tau/P$ values using an integrator instead of the moving averager 55.

Referring to FIGS. 10 and 11, the output of the low-pass filter is equivalent to the pickup output in a conventional optical disk apparatus. Therefore, the read signal may subsequently be processed as done in a conventional optical disk apparatus.

What is claimed is:

1. An optical disk apparatus, comprising:
   a laser light source,
   a light source driver which pulse-drives the laser light source,
   an optics for irradiating an optical disk with said pulse-drive laser beam emitted from the laser light source,
   a photodetector which receives a laser beam reflected from the optical disk,
   a pulse read signal generation unit which converts an output of the photodetector into an electric pulse read signal, and
   a continuous read signal generation unit which converts the pulse read signal into a temporally continuous read signal, the continuous read signal generation unit including an AD converter which operates in synchronization with each pulse of the pulse read signal, a DA converter which operates in synchronization with each pulse of the pulse read signal, and a low-pass filter.

* * * * *